Sept. 10, 1929.   K. E. PEILER   1,727,379
APPARATUS FOR FEEDING MOLTEN GLASS
Filed May 8, 1924
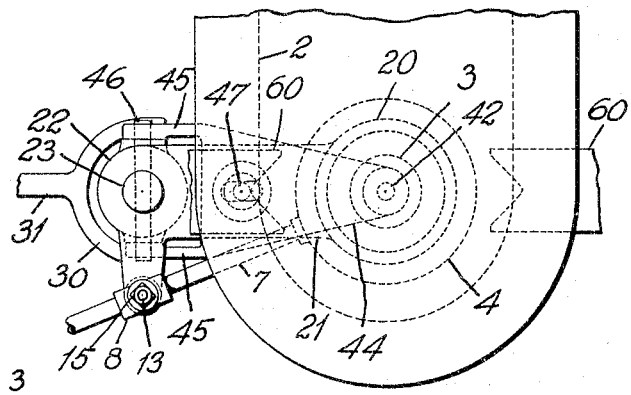
Fig. 2.
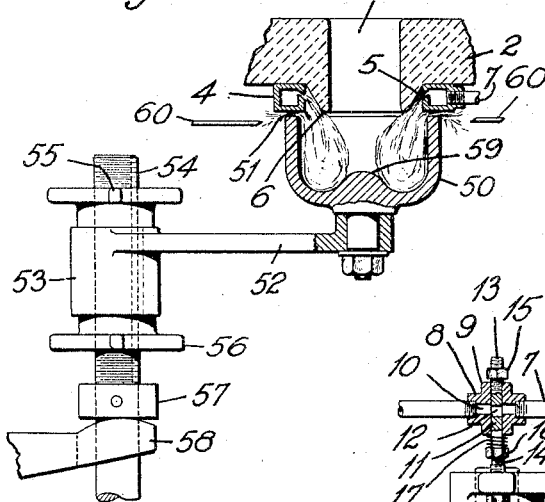
Fig. 3.
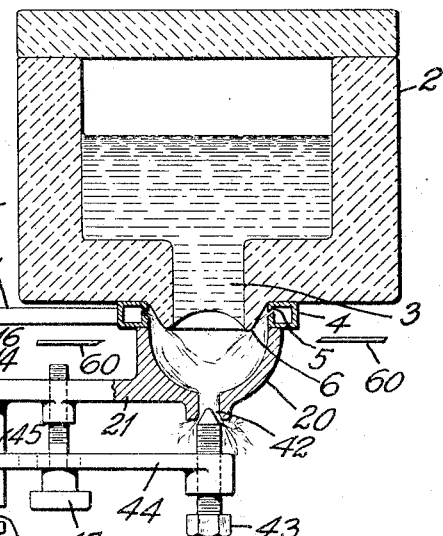
Fig. 1.
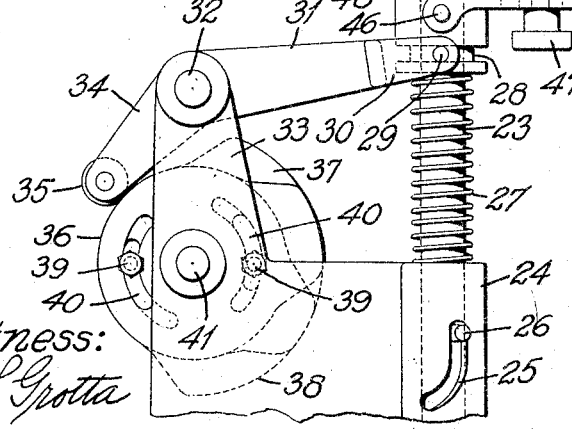
Witness:
S. S. Grotta
Inventor:
Karl E. Peiler:
by Wm H Homiss
Att'y.

Patented Sept. 10, 1929.

1,727,379

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR FEEDING MOLTEN GLASS.

Application filed May 8, 1924. Serial No. 711,766.

My invention relates to the art of feeding molten glass from a container in a succession of mold charges of suitable size, shape and temperature-condition to be fabricated in molds.

The general object of my invention is to provide a novel method and apparatus for controlling the successive production of mold charges through a downwardly opening outlet from a glass container. More specific objects are to utilize confined fluid pressure for restraining the issue of the glass in the intervals between the charge-forming operations, without causing the pressure fluid to impinge directly upon the glass in the discharge outlet; to provide improved means for reheating the shear-scarred stub of glass which remains above the shears after each severing operation; to provide for playing a flame continuously at the edges of the discharge outlet, thereby preventing the glass from chilling at any stage in the formation of mold charges; and to provide convenient means for regulating the pressure of the confined fluid which is effective to check the movement of the glass through the discharge outlet.

Another object of my invention is to provide an apparatus, of the character set forth, embodying a stationary burner which surrounds a submerged discharge outlet in the bottom of a container, and which is disposed above the plane at which the glass is severed. This burner is adapted to project an annular flame in the same general direction in which the glass issues from the outlet and the flame preferably impinges on the edges of the outlet, thereby maintaining the outlet at the desired temperature, and enveloping the depending mold charges in a curtain of flame in order to prevent chilling of the glass during any stage in the operation of the apparatus.

A further object of my invention is to provide a glass feeding apparatus embodying a swinging cup which is movable to and from a position below the discharge outlet of the glass container, and which cooperates with a stationary device, such as a burner, for projecting fluid under pressure adjacent to the outlet, in order to confine the flame or other fluid in the vicinity of the outlet, thereby producing sufficient back pressure to force the severed end of the depending column of glass back into the outlet.

Other objects of my invention contemplate the provision of suitable means for periodically moving the cup to and from operative position below the discharge outlet in timed relation with the operation of the severing mechanism; for varying the duration of the intervals between the movements of the cup; for varying the pressure within the cup; and for automatically reducing, if desired, the amount of fluid or the size of the flame projected in the vicinity of the outlet, when the cup is removed from the outlet.

The burner flames are allowed to escape from the cup, either through an opening in the cup itself, or through a gap between the upper edge of the cup and the adjacent surface of the burner. The confined pressure produced and applied by means of the cup may be controlled either by regulating the pressure of the fuel supplied to the burner, or by regulating the opening which is provided for the escape of the flames. Suitable means are provided for swinging the cup downwardly and laterally prior to the formation of each mold charge.

The accompanying drawing shows, in a somewhat diagrammatic manner, the essential features of apparatus suitable for carrying out my invention.

In the drawing:

Fig. 1 is a side elevational view, with parts in section;

Fig. 2 is a plan view of the structure shown in Fig. 1; and

Fig. 3 is a partial side elevational view, with parts in section, showing a modified construction.

In the drawing the numeral 2 indicates a glass container which may be a feeding chamber connected to a glass tank furnace, or may be any other container suitable for holding molten glass. The container 2 has a downwardly opening discharge outlet 3 formed in its bottom. An annular burner 4, having downwardly inclined discharge ports 5, surrounds the outlet 3 beneath the container 2. For the purpose of aiding in giving the flames from the burner 4 the desired downward direction, an annular projection 6 may be formed as an extension of the discharge opening 3.

The burner 4 is supplied with gas or with other suitable fuel through a pipe 7 controlled by a valve 8. If it is desired to maintain a continuous flame at the burner 4, the valve 8 may be an ordinary cut-off valve. If, on the other hand, it is desired that the flames of the burner shall be intermittent and shall be present in full force only when the swinging cup is beneath the burner, the valve 8 is arranged to be opened and closed automatically, to any desired extent, in timed relation to the movement of the pressure cup. Such an arrangement of the valve 8 is shown in Fig. 1, and includes a stationary valve casing 9 having a horizontal bore 10, and also having a vertical slot in which is mounted an adjustable slide 11 having an opening 12 which, in one position of the slide 11, registers with the bore 10 of the valve casing. The valve slide 11 is provided with upper and lower screw-threaded projections 13 and 14. A nut 15 is applied to the upper screw threaded projection 13 for the purpose of limiting the downward movement of the valve slide 11, and a nut 16 is applied to the lower projection 14 for the purpose of limiting the upward movement of the slide 12. A spring 17 surrounds the projection 14 between the nut 16 and the lower surface of the valve casing 9, and normally maintains the valve slide 12 in its lowest position, in which the flow of fuel through the pipe 7 is either cut off entirely or reduced to any desired extent. When the valve slide is lifted, the flow of fuel through the pipe is again established or is increased, as the case may be.

As shown in Fig. 1, a pressure cup 20, of suitable size and shape to fit beneath the burner 4, is carried on an arm 21 that extends horizontally from a member 22 that is secured to the upper end of a vertical rod 23. The lower end of the rod 23 extends loosely through a stationary bearing member 24 having a curved slot 25 through which extends a pin 26 carried by the rod 23. A spring 27 surrounds the rod 23 between the upper surface of the stationary bearing member 24 and the lower surface of the member 22, and this spring tends to maintain the member 22 and the pressure cup in the active position shown in Fig. 1, where the cup receives the flame from the burner 4.

For the purpose of swinging the pressure cup down and away from the glass discharge outlet, the member 22 is provided with an annular groove 28 which is engaged by pins 29 upon a shifting fork 30 carried by a lever 31 that is pivoted at 32 on a stationary bracket 33. A lever arm 34 is secured to the arm 31, or to the pivot 32 thereof, and carries a cam roll 35 which engages the periphery of a cam 36 which has adjustable lobes 37 and 38 that are fixed in their adjusted positions by means of bolts 39 extending through arcuate slots 40. The cam 36 is mounted on a horizontal shaft 41 driven from any suitable source of power, not shown.

By means of the mechanism just described, the member 22 is periodically lowered and raised, and carries with it the pressure cup 20. During the lowering movement, the engagement of the pin 26 in the curved slot 25 causes the rod 23 to turn during the latter part of its descending movement, and this turning movement of the rod 23 swings the cup 20 horizontally. During the rising movement of the cup which is produced by the spring 27, the cup is swung in the reverse direction to bring it to the position shown in Fig. 1.

In the structure shown in Fig. 1, the flames are allowed to escape from the pressure cup 20 through an opening 42, which is formed in the bottom of the pressure cup, and is throttled to an adjustable extent by means of a vertical screw-threaded plug 43 that extends through a screw-threaded opening near the end of a member 44 which, as shown in Fig. 2, is a plate of generally triangular outline having at its inner end two spaced arms 45 that are pivotally secured to the member 22 by means of a pin 46. An adjusting screw 47 extends through a slot in the member 44 and through a screw-threaded opening in the arm 21. By turning the screw 47, the member 44 may be swung around its pivot pin 46 to move the throttling plug 43 toward or away from the outlet 42. A finer adjustment of the throttling plug 43 may then be made by turning the plug 43 itself.

If it is desired to open the valve 8 each time that the pressure cup 20 is swung beneath the burner 4, the member 22, which carries the pressure cup, is also provided with an adjustable screw 48 which, when the pressure cup approaches the burner 4, engages the nut 16 and raises the valve slide 12 against the pressure of the spring 14. When the pressure cup is again swung down and away from the burner 4, the screw 48 is likewise moved away from the nut 16, thus enabling the spring 14 to close the valve, either entirely or partially as may be desired.

Fig. 3 shows a construction which differs from that shown in Figs. 1 and 2 in that the pressure cup indicated at 50 has no outlet for the escape of flame, but is so arranged and operated that a gap 51 is left between the upper edge of the cup and the lower surface of the burner, this gap being adjustable to permit the flames to escape to any desired extent. For the purpose of thus mounting and adjusting the pressure cup 50, this cup is mounted on an arm 52 carried by a member 53, which loosely surrounds a screw threaded vertical rod 54 to which adjusting nuts 55 and 56 are applied above and below the member 53, respectively. The rod 54 is also provided with a collar 57 which rides upon a shifting fork 58 that is operated in the same manner as the shifting fork 30 of Figs. 1 and 2, except that the fork 58, as shown, is arranged to lift the cup 50 and its attachments, and to allow the cup to descend and swing aside by gravity, while in the structure of Fig. 1 the shifting fork operates to lower the cup, and the spring 27 raises the cup into position beneath the outlet. The bottom of the cup 50 shown in Fig. 3 is provided with a central projection 59 which cooperates with the inner walls of the cup to form an annular recess that receives the flames from the burner 4 and deflects them outwardly and upwardly toward the outlet gap 51.

In the operation of the glass feeding apparatus described above, the glass issues in a vertical column through the outlet 3, and mold charges are severed from this column by means of shears which are shown diagrammatically at 60, Figs. 1 and 3. During this operation, the pressure cup 20 has been swung down and away from the outlet, and the flames from the burner 4 may be playing around and beneath the outlet, or, if desired, may be shut off during the charge forming and severing operation. I prefer to keep the flames playing around the outlet at all times, since this method of operation maintains the outlet hot and also retards the escape of heat from the issuing glass.

As soon as a charge of glass is severed by the shears 60, the shears are withdrawn to the position shown in Fig. 1, and the pressure cup 20 is swung up beneath the discharge outlet. If the flames of the burner 4 have been reduced or shut off, as by the use of the automatic valve shown in Fig. 1, the flames are reestablished in full force as soon as the pressure cup swings into its operative position.

When the pressure cup is in place beneath the glass outlet it receives the flames from the burner 4, and a pressure is built up within the cup. A portion of this pressure is exerted upwardly upon the glass in the discharge outlet, thereby checking or reversing the flow of glass at the outlet. The glass may assume somewhat the shape shown in Fig. 1, and the pressure thus exerted on the glass may be termed a static pressure, in contrast to the effect of flames or gases projected upwardly upon the glass in the discharge outlet. When flames or gases are projected directly into a glass outlet of this kind, there is danger that the flames or gases may blow upward into the container and produce bubbles in the glass, or cause an unsymmetrical discharge. In the use of the apparatus herein disclosed, where the flames travel downwardly past the glass outlet, no such effects are produced.

The pressure cup is kept beneath the glass outlet as long as may be necessary, and is then swung down and away from the outlet, the burner flames being either permitted to continue or being reduced or cut off, as may be desired, and the operations are repeated in regular cycles. The periods during which the cup is held beneath and away from the discharge outlet, and the rapidity with which the cup is moved, may be varied by suitably adjusting and designing the cam 36.

Another advantage of the system herein disclosed is that the pressure developed in the pressure cup may be regulated independently of the cup.

I have shown and described herein apparatus which is well adapted for carrying out my invention, but it will be understood that various changes in the construction and arrangement of parts may be made without departing from my invention, as set forth in the appended claims. It will also be understood that this invention may be employed with any desired mechanism for supplying glass to the discharge outlet, and in combination with any desired mechanism, such as an impeller, for controlling the movement of the glass above the discharge outlet.

I claim as my invention:—

1. Apparatus for feeding molten glass comprising a container for the glass having a downwardly opening discharge outlet, a cup adapted for movement to and from a position adjacent to and substantially in line with said outlet, movable means supporting said cup for movement to and from its said operative position, means adjacent to the outlet for discharging pressure fluid into said cup when the cup is adjacent to the outlet, whereby pressure will build up in said cup for restraining issuance of glass from the outlet, means for conducting pressure fluid to said discharge means, said pressure fluid conducting means including a valve having a movable member for regulating the flow of fluid through the valve, spring means for actuating said valve member to reduce the flow of pressure fluid through said valve to said discharge means when said cup moves away from its operative position adjacent to said outlet, and supporting means movable with said cup for actuating said movable valve member to permit an increased flow of pressure fluid through said valve to said discharge means as said cup is moved to its said operative position adjacent to the outlet.

2. Apparatus for feeding molten glass, comprising a container for the glass having a downwardly opening discharge outlet, an annular pressure fluid discharge member surrounding said outlet for discharging pressure fluid downwardly at the edge of the outlet, a cup movable periodically to and from a position below said outlet and adjacent to but spaced from said annular discharge member, whereby pressure fluid discharged from said annular member will enter said cup and part of said pressure fluid may escape through the space between said cup and said annular discharge member, and a central deflector within said cup for directing the pressure fluid from said discharge member outwardly and upwardly along the inner wall of said cup, whereby said pressure fluid will be prevented from impinging directly against the glass at said outlet.

3. Apparatus for feeding molten glass comprising a container for the glass having a discharge outlet, a cup, means supporting said cup for moving it to and from a position adjacent to and substantially in line with said outlet, means for supplying pressure fluid to said cup when the cup is in its position adjacent to the outlet, said pressure fluid supply means including a valve having a movable member for regulating the flow of fluid therethrough, means for actuating said valve member to reduce the flow of pressure fluid through said valve when the cup moves away from its operative position adjacent to the outlet, and means movable with said cup for actuating said movable valve member to permit an increased flow of pressure fluid through said valve as said cup is moved to its operative position adjacent to the outlet.

4. Glass feeding apparatus comprising a container having a downwardly directed discharge outlet for molten glass, an annular member surrounding said outlet for directing pressure fluid in a generally inward direction, and an annular downward extension at the lower end of said outlet for directing said pressure fluid in a generally downward direction at the lower end of said outlet.

Signed at Hartford, Connecticut, this 16th day of April, 1924.

KARL E. PEILER.